United States Patent [19]
Bier

[11] Patent Number: 5,862,395
[45] Date of Patent: Jan. 19, 1999

[54] CUSTOMIZABLE USER INTERFACES FOR PROGRAMMED COMPUTER SYSTEMS

[75] Inventor: Eric A. Bier, Los Altos, Calif.

[73] Assignee: Xerox Corporation, Stamford, Conn.

[21] Appl. No.: 174,949

[22] Filed: Dec. 27, 1993

Related U.S. Application Data

[63] Continuation of Ser. No. 573,512, Aug. 24, 1990, abandoned.

[51] Int. Cl.⁶ ........................................................ G06F 9/00
[52] U.S. Cl. ..................... 395/800.01; 395/680; 395/712
[58] Field of Search .................... 395/800, 700, 395/500, 275, 144–147, 100, 650, 800.01, 800.32, 800.43, 701, 712, 680, 376; 364/419, 419.1, 419.15, 419.17, 419.19; 340/700

[56] References Cited

U.S. PATENT DOCUMENTS

| | | | |
|---|---|---|---|
| 4,723,209 | 2/1988 | Hernandez et al. | 395/147 |
| 4,829,470 | 5/1989 | Wang | 395/147 |
| 4,931,783 | 6/1990 | Atkinson | 340/710 |
| 5,040,142 | 8/1991 | Mori et al. | 395/275 |
| 5,051,930 | 9/1991 | Kuwabara et al. | 364/523 |
| 5,063,600 | 11/1991 | Norwood | 382/13 |
| 5,065,347 | 11/1991 | Pajak et al. | 395/159 |
| 5,111,395 | 5/1992 | Numberg et al. | 364/419 |

OTHER PUBLICATIONS

Kinnell, S.K. "Hypertext on the PC: Guide, Version 2.0" Database. vol. 12, No. 4, Aug. 1989, U.S.A. pp. 62–66.

Hansen, W.J. "Enhancing documents with embedded programs: How Ness extends insets in the Andrew ToolKit." 1990 International Conference on Computer Languages. Mar. 12–15, 1990, New Orleans, U.S.A. pp. 23–32.

*Primary Examiner*—Alpesh M. Shah

[57] ABSTRACT

A software architecture is provided for allowing users to impart various types of button behavior to ordinary human interpretable elements of electronic documents by associating hidden persistent character string button attributes to such elements. This architecture permits such buttons to be edited and searched through the use of the edit and search routines that are ordinarily provided by standard document editors.

6 Claims, 6 Drawing Sheets

Buttons to open files
~/.profile
~/writings/diary

Buttons to open files
~/.profile — 20
~/writings/diary

Buttons to open files
~/.profile — 20
~/writings/diary
— 21

| Grid ↔ Grid |
*Fig. 5A*
| Grid ↔ Grid |
*Fig. 5B*
| Grid: on ↔ Grid: off |
*Fig. 5C*
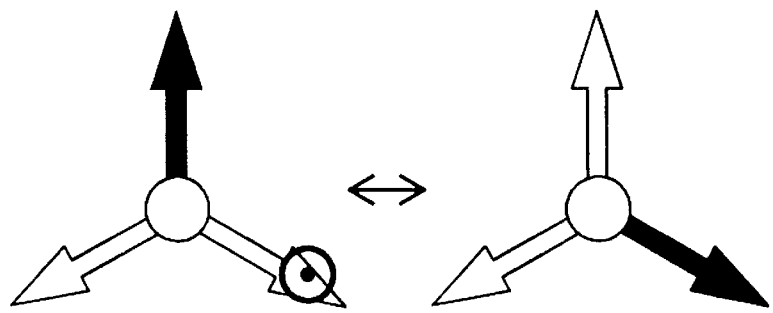
*Fig. 6*
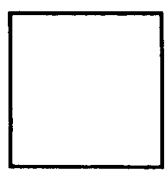     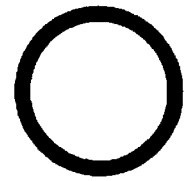
*Fig. 7A*              *Fig. 7B*

| Search | Yes | No | Substitute |
Target: Apple
Replacement: *Banana*
Pick one or more: Text Looks Format Style Comment
☐ Match Case       ☐ Match Words Only
*Fig. 9A*
Apple ˜ *Banana*: | Search | Yes | No | Substitute | Parameters |
*Fig. 9B*
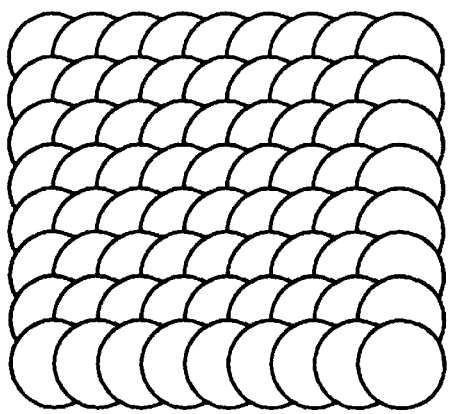
*Fig. 10A*
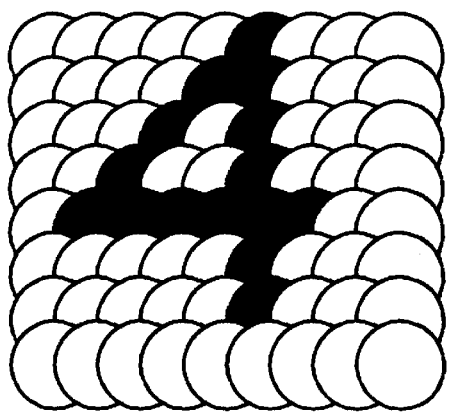
*Fig. 10B*

CUSTOMIZABLE USER INTERFACES FOR PROGRAMMED COMPUTER SYSTEMS

This is a continuation of application Ser. No. 07/573,512, filed Aug. 24,1990, now abandoned.

FIELD OF THE INVENTION

This invention relates to customizable user interfaces for computer resident software systems and, more particularly, to a software architecture that enables non-programmers, as well as programmers, to tailor the user interface of their computing resources (e.g., personal computers, workstations, etc.), thereby permitting them to create interfaces that more closely conform to their individual needs and preferences. Even more specifically, the software architecture of this invention enables an extension of the capabilities of text and graphics editors (collectively referred to herein as "document editors" to allow users to embed active buttons in structured electronic documents as hidden persistent character string attributes of ordinary textual and/or graphical elements of such documents (such as text, graphics, tables and equations), and to allow users to specify the behavior characteristics of such buttons.

BACKGROUND OF THE INVENTION

Software production is a growth industry because of the worldwide commercial demand for computerized solutions to customer requirements in many different market segments. Some computer users have substantial programming skills, but the computer has become a tool that often is employed by users who lack the skills and/or motivation to engage in extensive computer programming. For that reason, software suppliers have invested substantial effort and expense in developing user interfaces that permit users to focus on applying computers to their intended tasks. Graphical user interfaces and window packages are notable examples of the software systems that now are being offered to facilitate the use of computers by persons ranging from non-technical users to highly skilled computer professionals. However, that system level software does not, in itself, permit of substantial differentiation between the diverse interface needs and preferences of different users.

Features of software user interfaces that are essential to one user may needlessly occupy space on another user's display screen. Likewise, some users need features that were not included by the application programmer. Consequently, some software packages have customizable user interfaces. For instance, there are packages that offer a variety of predefined interface options, so that users may customize their interfaces by selectively activating certain of the options to the exclusion of the others. Even more directly relevant to this invention, there are software packages that include tools which enable users to create active buttons and menus for causing the computer to perform functions in direct support of the users' individual needs and preferences.

More particularly, the HyperCard program enables users to create personalized buttons, forms and layouts. It supports the so-called HyperTalk language to allow users to program such buttons. See D. Goodman, *The Complete HyperCard Handbook*, Bantam Books, 1987. Similarly, the Xerox ViewPoint product supports a language called CUSP for programing buttons that can be inserted into documents. See *VP CUSP Buttons Reference*, VP Series Reference Library, Version 2.0, Xerox ViewPoint, Xerox Corporation, 1988. These CUSP buttons can be programmed to move icons and windows, as well as to print files, fill in forms, organize information into electronic file folders, and assist in performing other tasks. Spreadsheet programs also are of some interest because they conventionally permit the user to program in the equations for performing the calculations that the user wishes to have performed.

The so-called Andrew document editor is still another interesting example of the current state of the art because it permits buttons to be included in documents, to be transmitted via electronic mail, and to be employed by recipients of such mail messages. See J. H. Morris et al., "Andrew: A Distributed Personal Computing Environment," *Communications of the ACM*, Vol. 29, No. 3, March 1986, pp. 184–201. Furthermore, the Xerox Interlisp environment has a window manager, called "Rooms," which allows the user to create buttons for switching from "room-to-room" (i.e., from one user assembled collection of files and processing tools to another or, in other words, from one "desktop" to another), for starting up application programs, for recording a program state and later restoring it, and for performing other functions the user may wish to automate. See A. MacLean et al., "User Tailorable Systems: Pressing the Issues with Buttons," *Human Factors in Computing Systems, Proceedings of CHI '90*, April 1990, pp. 175–182. The Rooms supported buttons can be transferred via electronic mail to other users who are employing the Xerox Interlisp environment, and can be incorporated into a user's desktop to become a permanent part of the user's workstation environment. Moreover, these buttons can be customized by editing the LISP programming language functions they embody or by using menu commands to change their position and/or appearance.

As a general rule, the buttons the prior art has provided for the customization of user interfaces have been application specific, rather than being tools that can be shared by a variety of different applications. This is a significant disadvantage because most users find that they only have a limited amount of display screen space that they are willing to allocate to customized buttons at any given time, even though the users may be performing functions which cause them to switch back and forth frequently between different applications. Furthermore, when a user is employing an application that does not permit such buttons to be embedded in it, the custom buttons the user may want to employ must be spatially separated from the application on the user's display screen, thereby adding to the burden on the display screen space and also forcing the user to shift attention back and forth between the application space and the button space.

Still another disadvantage of the prior proposals for using buttons to customize user interfaces is that when such buttons are embedded in applications, the embedded buttons are treated as "special'" objects.

Therefore, even though a button residing in a text document might itself be a string of text, the editing of the button requires the use of different operations than are employed for editing the text in which the button resides. Moreover, an ordinary textual search operation will not find such a button, even if its text string matches the search pattern, because the button is not recognized as being a textual component of the document.

SUMMARY OF THE INVENTION

This invention provides a software architecture that allows users to impart various types of button behavior to ordinary human interpretable elements of electronic documents by associating hidden persistent character string attributes to such elements. This architecture permits such buttons to be edited and searched through the use of the edit and search routines that are ordinarily provided by standard document editors.

BRIEF DESCRIPTION OF THE DRAWINGS

Still further defects and advantages of this invention will become apparent when the following detailed description is read in conjunction with the attached drawings in which:

FIGS. 5A–5C illustrate user feedback from a multi-state button;

FIG. 6 illustrate user feedback from a set of graphical radio buttons;

FIGS. 7A and 7B illustrate user feedback from a pair of associated radio buttons that are embedded in a graphical editor;

FIGS. 9A and 9B illustrate a control panel constructed in accordance with the present invention and a compact representation thereof, respectively; and FIGS. 10A and 10B illustrate a graphical document composed of circles that function as multi-state buttons.

DETAILED DESCRIPTION OF THE ILLUSTRATED EMBODIMENT

Figures 1, 2A, 2B, 2C:
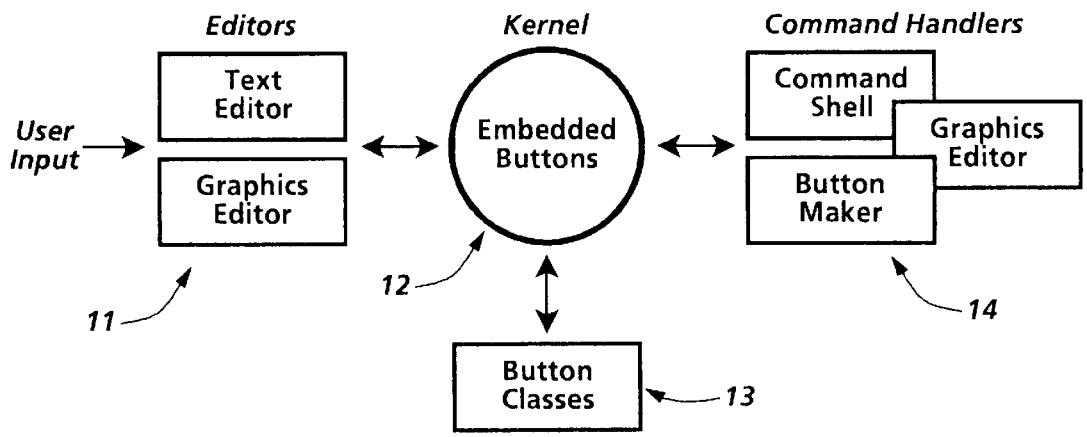
FIG. 1 is a schematic diagram of the software architecture of the present invention.
FIGS. 2A–2C illustrate successive steps in the creation of a button in accordance with this invention.

While the invention is described in some detail hereinbelow with specific reference to an illustrated embodiment, it is to be understood that it is not limited to that embodiment. On the contrary, the intent is to cover all modifications, alternatives and equivalents falling within the spirit and scope of the invention as defined by the appended claims.

A. The Environment.

This invention builds upon a few features that are found in certain modern document editors:

(1) the ability to associate arbitrary textual attributes with document elements.

(2) the ability to direct input actions to applications other than the document editor itself, and (3) the ability to interpret an editing language for performing editing actions that are specified by a software program, rather than by a human user.

Accordingly, editors which embody these features are described briefly hereinbelow. Furthermore, publicly available references are identified, so such references hereby are incorporated by reference to more fully define a suitable environment for this invention.

1. Hidden Persistent Character String Attributes.

The Xerox Bravo text editor (see the "Bravo Manual," *Alto Users Handbook,* Xerox Palo Alto Research Center, 1979, pp. 31–62), the Andrew editor (see J. Morris et al., supra), the Xerox Star (J. Johnson et al., "The Xerox Star: A Retrospective," *Computer,* Vol. 22, No. 9, September 1989, pp 11–29), and the Grif editor (see R. Furuta et al., "Interactively Editing Structured Documents," *Electronic Publishing,* Vol. 1, No. 1, April 1988, pp. 19–44) are examples of document editors which permit the user to associate hidden persistent attributes (such as type face, color and alphabet) with the usual characters or graphical elements of a document. These attributes are "persistent" because they are stored with the document in long-term memory, such as on magnetic disk or tape, in stable semiconductor memory, or in other persistent memory resources. Moreover, they are electronically transferable from user-to-user or computer-to-computer. In addition, the attributes are "hidden" because their textual descriptions (e.g., "red"' or "Timesroman") are not rendered as component parts of the documents in which they are embedded when such documents are viewed or printed. Instead, the rendering process applies those attributes to the document elements with which they are associated, thereby causing those elements to be rendered in, say, red or with a Timesroman type face.

Some existing editors, such as the Tioga editor (see R. Beach, "Setting Tables and Illustrations with Style," Ph.D. Thesis, University of Waterloo, Waterloo, Canada, 1985— also available as Xerox PARC Technical Report CSL-85-3) extend the notion of hidden persistent attributes to permit arbitrary character strings of the user's choosing to be included as hidden persistent attributes of ordinary document elements, such as textual characters and graphical shapes. It is believed that this is an important feature for document interchange among users residing in different hardware and software environments, so it is expected to become an even more commonplace characteristic of future document editors.

2. Input Redirection.

Some existing editors are able to redirect input actions to application programs other than the editor itself. For example, the Symbolic Presentation Manager (see S. McKay et al., "A Presentation Manager Based on Application Semantics, *Proceedings of the ACM SIGGRAPH Symposium on User Interface Software and Technology,* November 1989, pp. 141–148) permits commands that a user may enter by actuating a "mouse" button while the cursor is pointing at a certain text element to be redirected from the editor to a separate application program. Similarly, HyperCard provides input redirection so that the user can cause a HyperTalk program to execute by actuating a mouse button.

3. Run-time Interpreted Editing Languages.

There also are known document editors that are able to perform run-time interpretation of editing languages. For example, the EMACS text editor interprets a dialect of the LISP programming language to support text editing macros. Similarly, the aforementioned Tioga editor permits all editing actions to be expressed in an interpreted language, thereby allowing editing operations to be performed interchangeably under the control of either a human user or a computer program.

B. The Embedded Buttons Architecture.

In accordance with the present invention, there is a software architecture which takes advantage of the above-described features of known document editors (i.e., hidden persistent character string attributes, input redirection, and a run-time interpreted editing languages ) to give users the option to add button behavior to any textual or graphical element of the renderable portion of an electronic document (e.g., text, graphics, tables and equations, as opposed to machine interpretable elements that define the structure and layout of such documents), such that the buttons are not treated specially under normal editing and searching operations. More particularly, as shown in FIG. 1, there are one or more document editors 11, each of which includes an input redirection software switch that a user may set to a "buttons off" state for disabling input redirection or to a "buttons on" state for enabling input redirection. Whenever the input redirection switch of the editor 11 that is managing a particular document is set to a "buttons off" state, the editor executes all of the input commands it receives to carry out its normal editing operations. If, however, the input redirection switch of that editor 11 is set to a "buttons on" state, it routes certain preselected input commands, such as the clicking of a mouse button while the cursor that is controlled by the mouse is positioned to point at a document element having an embedded button, to a centralized software module 12 called the "embedded buttons kernel."

Whenever a document editor 11 is operating in a "buttons mode" (i. e., with its input redirection switch set to a "buttons on" state), the editor 11 examines the document elements as they are selected to determine whether such elements have button attributes and, if so, to prepare itself for redirecting certain predefined user input actions to the embedded buttons kernel 12. Upon receiving such a redirected input command, the embedded buttons kernel 12 relays the character string that defines the button attributes of the selected document element to a class-specific button handler within a button classes manager 13. As more fully described hereinbelow, this button handler then reads the button attribute of the selected document element to determine the actions that are to be taken and calls the command handler routines 14 that are needed for performing those actions and sends an editor input language string to the editor to provide the desired feedback user. As will be seen, the command handlers 14 may include any of the document editors 11, as well as additional application programs.

In keeping with this invention, the document editors 11 need not have any knowledge about the internal form or content of any of the button attributes, except for the knowledge that all such attributes are defined by character strings. Because these strings are distinct from the attributes normally found in the editor data structures, ordinary editing and search operations of the editor that is actively managing such a document may be utilized to edit and search for the buttons that are embedded in the document whenever the input redirection switch of the active editor is set to a "buttons off" state (and many editing functions continue to work even in the "buttons on" state) "buttons off" state. On the other hand, if the input redirection switch of the active editor 11 is set to a "buttons on" state, the character string defining the button attributes of any button that is triggered by the user is passed to the centralized embedded buttons kernel 12 where it is parsed, thereby causing one of the button handlers within the button classes 13 to dispatch to the application programs 14 that are needed for carrying out the functions the button is intended to perform.

As a result of the above-described architecture, any document editor can be straightforwardly programmed to treat elements of documents that are loaded into it as buttons. Furthermore, all buttons of any given class behave in a consistent manner, regardless of the type of document or document element in which they are embedded, because their behavior is governed by a common body of software.

C. Button Implemented Functions.

At this point it will be understood that the button attribute architecture that is provided by this invention enables users of electronic document editors to associate active button behavior with the elements of an electronic document so that by pointing at those document elements with a cursor and by then actuating a suitable input device (such as a button on a mouse, the contact detector on the tip of a pen, or a key on a keyboard) the user can activate preselected application routines. A detailed introductory example is set forth below to illustrate a typical implementation of the invention as applied to a relatively straightforward file opening task. This example will shows how a user can turn an arbitrary string of text characters into a button that can still be edited and searched as a normal document element. However, before turning to the introductory example, it is to be noted that the system disclosed herein can support various different types of buttons, including "pop-up buttons" that perform an application function when they are triggered, buttons called "multi-state buttons" that remember a value and change value when triggered, and buttons called "radio buttons" that are either "on" or "off" and that make sure that only one button in their group is "on" at any given time. In the interest of completeness, subsequent sections will describe those three types of buttons and provide examples illustrating their characteristics and use.

1. An Introductory Example: Buttons That Open Files.

For purposes of this example, it will be assumed that a user of the UNIX operating system wishes to make it very easy to edit a file named "~/writings/diary" in which the user keeps daily notes. Moreover, it is further assumed that this user has a file "AlwaysOpen" that is displayed on his computer display screen whenever he is logged in, so he the user adds the text string "~/writings/diary" to that file. At this point the file "AlwaysOpen" typically looks like FIG. 2A. Then by using a suitable cursor controller, such as a mouse, the user selects the string "~/writings/diary" and activates a button, available from a set of tools in his window system, that draws a box 20 around the selected text string and associates with it a text string containing a command to start up a text editor window on the "~/writings/diary" file. Now, "AlwaysOpen" looks like FIG. 2B. Thereafter, to try out the new button that has been created, the user selects the box enclosed "~/writings/diary" text string, such as by using a mouse to position a screen cursor (the black circle with a black dot in its center that is shown at 21 represents the mouse controlled cursor) to select it. The user then presses one of the physical buttons on the mouse, thereby causing the opening of a new text editor window containing the contents of the file ~/writings/diary.

As will be recalled, the text string "~/writings/diary" acts as a button only while the text editor that is managing the "Always Open" file is in a "buttons on mode" (i.e., while its redirection switch is set to a "buttons on" state). Consequently, if the user turns off the buttons mode, the text of the "AlwaysOpen" file then can be edited and searched using the standard text editing and search features of the that editor. For instance, if an error was made in entering the file name of the diary, the user can use ordinary editing operations to correct the name under which that file is listed in the "AlwaysOpen" file, even after the button has been created on the incorrect file name.

2. Button Types.

This section describes three of the more basic types of buttons that are supported by this invention: pop-up buttons, multi-state buttons, and radio buttons, and includes examples showing how they are used in different kinds of documents. Of course other button types could be added, so the described types are merely intended to be representative examples.

a. Pop-Up Buttons.

When the user holds down a mouse button or the like over a document object that has been made into a pop-up button, a pop-up menu appears, with one of its entries centered on the cursor. Advantageously, the menu entry that is centered on the cursor depends on the mouse button that is being depressed, as well as on whether, say, either or both of the CTRL and/or SHIFT keyboard keys also are being depressed. In addition, if the user clicks the mouse button quickly, the pop-up menu display may be suppressed in favor of directly notifying the application of the user's menu selection as determined by the combination of CTRL, SHIFT, and mouse buttons that the user is employing. This pop-up menu facility, but not its use for active documents, has been previously described. See K. Pier et al., "An Introduction to Gargoyle: An Interactive Illustration Tool," *Document Manipulation and Typography, Proceedings of EP '88*, Cambridge University Press, 1988, pp. 223–238. Also available as Xerox PARC Technical EDL-89-1.

Figure 3A:
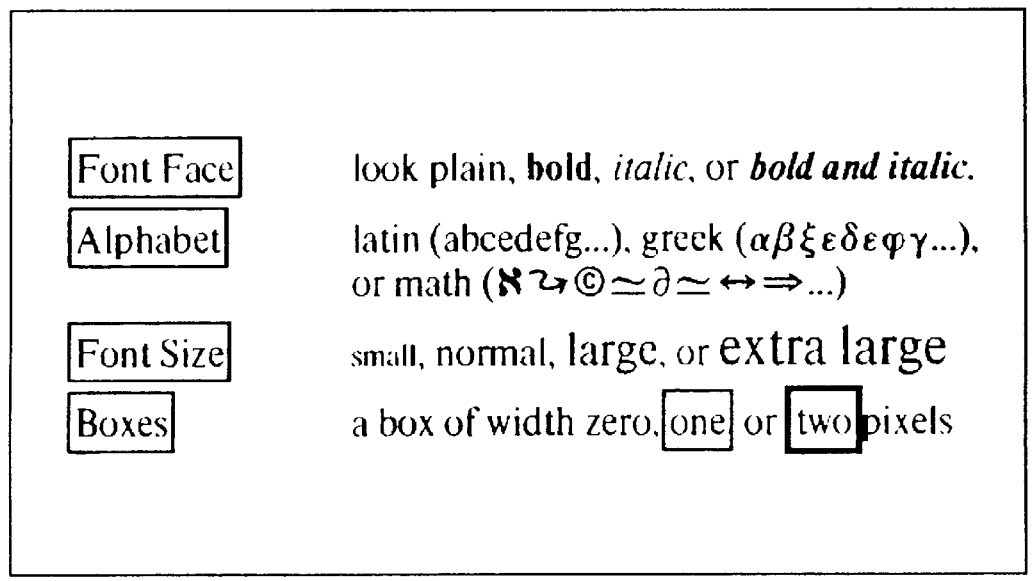
FIGS. 3A and 3B illustrate a menu of a pop-up button.
Figure 3B:
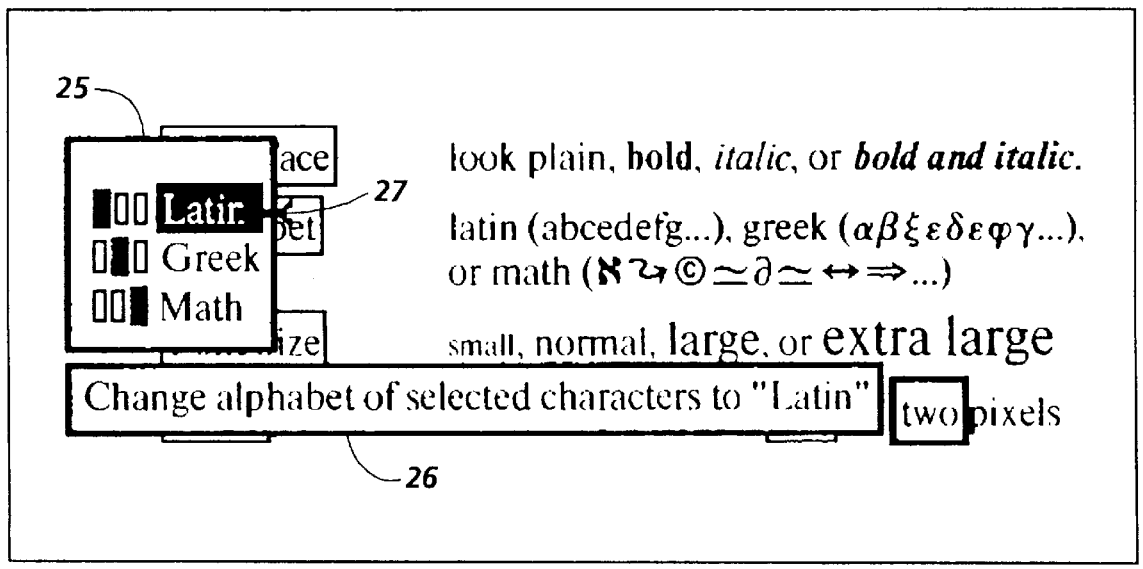

FIG. 3A illustrates an active document containing four pop-up buttons, each of which is shown surrounded by a box. Each button performs one or more text editor macros. Next to each button is a description of its function. In FIG. 3B, the user is holding down the mouse over the text string "Alphabet," thereby causing a pop-up menu to appear offering to allow the user to change the alphabet of the currently selected text string in some other document (not shown). The pictorial prompt 25 that is superimposed on the menu indicates which of the three mouse buttons can be used as an accelerator for future button presses. Furthermore, the rectangle 26 displays feedback describing the currently selected menu entry, and the arrow 27 that is partly visible over the white-on-black word "Latin" in FIG. 3B is the cursor (the cursor assumes an arrow shape when a pop-up menu is active).

Figure 4A:
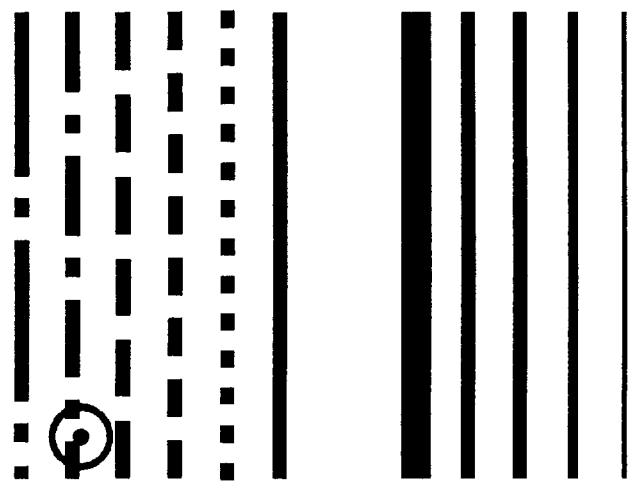
FIGS. 4A and 4B illustrate the use of buttons to perform graphical style macros by transferring their own style properties to a selected graphical object.
Figure 4B:
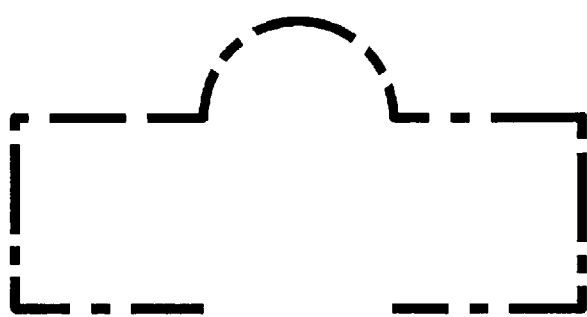

Each line segment in FIG. 4A is a pop-up button that transfers its dash pattern or line width to a selected graphical object. Here, these buttons have been used to change the dash pattern of the multi-segment shape shown in FIG. 4B. There are known graphics editors, such as the aforementioned Gargoyle editor, which use "snap-dragging" gravity to make it possible to select buttons, like these lines, that have little area. See E. Bier et al., "Snap-Dragging," *Computer Graphics*, Vol. 20, No. 9, August 1986, pp. 233–240.

b. Multi-State Buttons.

Multi-state buttons respond to user input commands, such as mouse clicks, by modifying the contents of a distinguished variable, called Value, that is present in each button of this class. The Value variable cycles through a set of strings that are defined by the user. For instance, if the strings are "on" and "off," the button switches between "on" and "off" when it is triggered. If the strings are "apple," "banana," and "grapefruit," the button cycles through those names.

The user/custom interface designer can decide how each state is to be displayed. FIGS. 5A–5C show several buttons each of which has two states: on and off. The current state of these buttons is indicated by changing font (FIG. 5A), reversing the video contrast of text and background (FIG. 5B), or changing the text contents of the button (FIG. 5C). Indeed, it will be evident that any suitable document editor operation can be used to achieve such highlighting.

Multi-state buttons are most useful when they are used to control an application. As described in more detail hereinbelow, an application can read the value of a button by providing the button's name and the virtual memory address of the document in which the button is located to the embedded buttons system. Then, if the button of the given name is found in the given document, the system returns its value to the application. The application does not need to know where the button is located in the document, or even what the class of the button is. An application can be notified when a given named button is trying to change state, thereby enabling the application to control the timing of such a state change. Accordingly, actions that are initiated by triggering buttons in an active document can be synchronized with other actions of an application program.

c. Radio Buttons.

A radio button is a member of a group of buttons, only one of which may be "on" at a time. Thus, triggering such a button typically turns that button "on" while causing all other buttons in its group to turn "off." As with multi-state buttons, the user/custom interface designer can decide how such a button will change appearance to reflect its state. In this instance, radio buttons refer to their group by name, rather than by document locality, so they need not be positioned near each other.

Each arrow in FIG. 6 is a radio button. As shown, clicking on one arrow makes it black, and turns all of the other arrows white.

D. A More Detailed Review of the Button Attribute Architecture.

The button attribute architecture of this invention provides a way to modify and structure document editors so that ordinary textual and graphical document elements can act as buttons. In this section, the architecture and its novel aspects are described in more detail, and it is more fully pointed out how this architecture takes advantage of modern editor technology.

As will be seen, the button attribute architecture has five main parts:

1. Button attributes. A character string, called the "button attribute," is linked to any document element, call it "E," that is to have button behavior. This character string describes the type of button behavior desired.

2. Editor characteristics. Any document editor that is to be employed for carrying out this invention must be able to find and enumerate those document elements that have button attributes and must be able to re-route (to the Embedded Buttons kernel) certain user input actions (e.g., mouse actions) that occur on or near document elements that have that attribute.

3. The Embedded Buttons kernel. The Embedded Buttons kernel parses button attributes to establish communications between the editor that is managing the document containing the buttons, a button handler appropriate to the button class specified in the button attribute and the application packages, called "command handlers," that are called upon to perform an action specified by a given button attribute. The communications that are provided also enable the button handler to call upon the editor in which the button is embedded to perform any feedback associated with the button action. Furthermore, when button-containing documents are used as application control panels, the kernel responds to requests to link particular documents to particular application windows and routes button related input actions to the appropriate window.

4. Button Classes. The button classes are a set of button handlers that define the specific functions of the different classes of embedded buttons. New button classes can be added to the system at run-time by calling a routine in the kernel that registers the new class. Thus, the button handler software for a new button class can be debugged without reloading other parts of the system.

5. Command Handlers. Command handlers are applications which register themselves with the Embedded Buttons kernel at some time before the user begins to use embedded buttons that refer to them (e.g., at the time when the user logs in or at the time when the embedded buttons software is loaded). When an embedded button is triggered, the appropriate command handler is called by the button handler for the class to which the button belongs to carry out the action described in that button. Like button classes, new command handlers can be added dynamically by registering them with the kernel, thereby making them easy to debug without reloading the rest of the system.

Furthermore, if a button is to change its appearance when it is actuated, a sixth architectural feature is required:

6. The Editor input language. The document editor in which E is embedded must provide an input language (consisting of text strings) that describes editing actions that can be performed on the document. By including such an editor-interpretable input string in the button attribute, editor actions can be described in the button itself that will produce the desired change of appearance of the button (or any other document elements) when the button is triggered.

These six architectural features support several button functions including:

a. responding when the user triggers an embedded button,
b. updating or inspecting the value of a button or buttons at the request of an application program, and
c. linking a document to an application window (which acts as the command handler for a subset of the buttons in the document) and routing button actions to the linked window.

FIG. 1 illustrates the communication paths that are provided by the embedded buttons architecture. As is shown, the kernel 12 acts as a switchboard to route messages between the other components. With this architecture it is easy to add new editors 11, button classes 13, or command handlers 14 dynamically; they register their names and routines with the kernel, which thereafter will route any messages that comes from the registered name.

Each of the six parts of this architecture—the button attributes, editor characteristics, the embedded buttons kernel, the button classes, the command handlers, and the editor input language—are described in further detail hereinbelow. In the course of that description it will be shown how the architecture accomplishes each of its three main functions: responding to user input commands (e.g., button clicks), updating and inspecting values, and linking documents to applications.

1. The Button Attributes.

As previously pointed out, all editors that support this invention must be able to associate with any given document element (e.g., text character, paragraph, graphical shape, etc.) a string-valued attribute, called the "button attribute." This string must be stored with the document when the document is stored on magnetic disk or other persistent media. In operation, when the document is read into memory, this button attribute string is read by the embedded buttons kernel and is turned into a data structure for fast access. If the document editor is able to associate such a button attribute data structure with document elements (in place of the button attribute string) performance is improved because the embedded buttons kernel then does not need to re-read the string each time the button is triggered.

The button attribute text string is written in a simple a language, called "Poppy," that binds named fields to text string values. This language was inspired by the CUE Forms language. See T. Kaczmarek, "CUE Forms Descriptions," Internal Technical Report of University of Southern California, Information Sciences Laboratory, Jul. 25, 1984. While users can edit Poppy strings by hand to change the behavior of buttons, there are other ways to change the button behavior. For instance, to create a new button, users can select the document element that is to become a button and activate an existing button, called a "buttonizer," whose purpose it is to create new buttons. As will be seen, a typical buttonizer button is more fully described hereinbelow.

As an example of a button attribute, the Poppy language description of a typical pop-up button changes the color of selected objects is here. This pop-up button is shown here:

```
Poppy1
Class: PopUpButton
CommandHandler:Colorizer
Menu: (
    ((SetColor Red) "Red" "Makes selected objects red")
    ((SetColor Green) "Green" " Makes selected objects green")
    ((Set Color Blue) "Blue"" Makes selected objects blue")
)
Feedback: (
Enter: <SetCursor bullseye>
Down: (BeginButton MakeBold EndButton)
Exit, EndActivity: (BeginButton MakeItalic EndButton)
)
```

In the foregoing example, the first word, "Poppy1," means that what follows is a program in the Poppy language, version 1. As will be seen, it is followed by four button data fields: Class, CommandHandler, Menu, and Feedback.

All buttons must have a Class field because a button's class determines which body of code (i.e., button handler) will handle user input to the button. In this case, the Class is "PopUpButton."

The CommandHandler field identifies the command handler application 14 (FIG. 1) that will receive commands when a selection is made in this button's pop-menu by using the name under which that application is registered with the kernel 12. The command handler for the above button is a "Colorizer" application, which changes the color of selected objects to a color named in the button's menu.

The Menu field in the above example describes a pop-up menu in a LISP-like syntax that the pop-up button class handler understands. This menu has three entries, labeled "Red," "Green," and "Blue." The text string following the entry labels is the documentation string that will be displayed when the cursor is over that entry. The parenthesized expression before each entry name represents a text string that will be sent to the application.

The sub-fields of the Feedback field determine the actions that are to be taken when various button events occur. The "Enter" sub-field causes the cursor to change to a bullseye shape when it enters this button. The angle brackets around "SetCursor bullseye" tell Poppy to interpret this expression itself, rather than passing it to the editor that manages the button. The "Down" sub-field contains an expression string in the input language of the aforementioned Tioga text editor for causing the editor to apply a bold-faced font to the text of this button. Likewise, the "Exit, End Activity" field restores the button to a plain-face font when the button's application has finished its computation or when the user aborts the operation by moving the cursor out of the button before the click is complete.

In the Poppy language, the value of each field is either a single alphanumeric string delimited by white space or a string (which can include white space) between standard delimiters such as quotation marks "", parentheses (), and angle brackets <>. When an editor reads a button-containing file from disk, it causes the Embedded Buttons kernel to parse the button attribute of each button. The kernel parses the button attribute string into a set of (field name)/(field value) pairs, where each field value is an uninterpreted string and passes those pairs to the appropriate button handler for the buttons class, thereby causing the class-specific button handler to build a run-time data structure representing the button.

Multi-state buttons and radio buttons have two additional data fields—Name and Variables—which are expressed in Poppy as, for example:

Name: Fruit

Variables: (Value: {orange, apple, banana}=orange).

In the above example, Value is a variable that may take on the values orange, apple, or banana, and its current value is "orange." Applications refer to this value, for purposes of reading or writing it, by using the button's name, "Fruit." If more than one button has the same name, the value of this button name could become ambiguous. Therefore, this problem typically is solved by forcing all buttons with the same name to have the same value, whereby changing the value of any one of them causes all of the others to change. Alternatively, however, it would be possible to look up the value of a given variable name in a particular sub-part of a hierarchically structured document. For instance, if a button, A, refers to a value by a variable name, N, the system could look for the value of the variable N first in the paragraph in which A occurs, next in the sub-section in which A occurs, next in its section and so on. In this way, the hierarchical structure of documents can be used to disambiguate names.

2. Editor Characteristics.

The editors 11 (FIG. 1) may need to be modified in a few simple ways in order to participate in the embedded buttons architecture. In particular, they should have routines to:

a. enumerate all elements in the document that have the button attribute.

b. describe the button attribute (and other attributes) of a given document element.

c. edit the document in accordance with editing commands provided in an editor-specific command language (optional).

d. report whether a given cursor position is inside or outside of a given document element.

In addition, for improved performance, an editor may additionally embody a routine that:

e. associates a pointer to an arbitrary data structure with a document element.

Also, some buttons require that the editor:

f. describe the contents of a button as a text string.

This last mentioned feature makes the most sense if the button is embedded in a text document.

Finally, the editors must be able to delay the processing of selection actions (e.g., pointing with a mouse or using cursor keys) when they are in a "button mode" until they have determined whether the document element under the cursor at any given point in time possesses a button attribute or not. If such an attribute is found, the editor takes no editing action. Instead, it passes along to the embedded buttons kernel the information that the mouse button was depressed while the user was pointing to an embedded button. On the other hand, in the absence of such an attribute, the editor performs whatever editing action it normally performs when a mouse button is depressed over the given document element.

Fortunately, these features are generally easy to implement. All mouse-based document editors already contain code for determining the document element to which the user is pointing. Furthermore, most such editors have code fore dispatching to an appropriate routine to handle each input event, and all WYSIWYG (What You See Is What You Get) editors have code for accessing the attributes of document elements. Therefore, they are easily extended to include code to determine whether or not the button attribute is present, to dispatch to the embedded button kernel when appropriate, to modify these attributes, and to search for document elements that have particular attributes.

3. The Embedded Buttons Kernel.

The Embedded Buttons kernel provides two types of routines:

(1) Registration procedures that allow new command handlers, button classes, and application windows to become known to the system.

(2) Action routines that contribute to the use of buttons by users and software routines.

The basic routines of each of those types are described in this section.

a. Registration Procedures.

A message handler suitably registers itself with the embedded buttons kernel by calling a kernel routine:

RegisterMessageHandler: PROCEDURE [name: String, notifyProc: RegisteredNotify:Proc];

where "String" is an ASCII text string, and "RegisteredNotifyProc" is a procedure of type:

RegisteredNotifyProc: TYPE=PROCEDURE [action: String, button Button] RETURNS

[success: BOOLEAN].

In this "RegisteredNotifyProc" "button" describes the embedded button that was pressed to trigger the action and BOOLEAN is a true/false value. Consequently, when the kernel reads a button attribute that requests that an action be sent to a command handler having a registered name, the kernel calls the associated RegisteredNotifyProc, thereby passing the action request to the command handler as a parameter.

A button class registers itself with the embedded buttons kernel by calling the kernel routine:

Register ButtonClass: PROCEDURE [buttonClassName: String, buttonClass: ButtonClass];

where ButtonClass provides routines for performing the following procedures:

(1) Instantiate. Create run-time data structures for a given button of a specified class from its button attribute.

(2) File Out. Produce a revised button attribute for the given button (e.g., if its value has changed since it was created) from its run-time data structure whenever the button's host document is written to disk.

(3) Handle Triggering. Respond to triggering actions the given button. This routine decides what feedback should be performed and when the command handler should be notified.

(4) Get Value. Report the current value of the given button when the kernel inquires about it.

(5) Set Value. Respond to requests to change the value of a given button. Buttons may respond, for instance, by changing their run-time data structures and by producing appropriate human-visible feedback.

(6) Default Behavior. Perform the behavior the given button should exhibit if it has no specified command handler for it. For instance, buttons with state often change to the next state when triggered if no command handler is specified.

When an application wishes to link a particular document to a particular application window, it calls:

LinkDocToApplication: PROCEDURE [doc: ActiveDoc, handlerName: String, window: Window, applicationData: POINTER, notifyProc: NotifyProc];

where "ActiveDoc" represents the virtual memory address of the button-containing document that is to be linked. Once the above routine is called, the kernel subsequently is able to handle triggering on any button in "ActiveDoc" whose command handler field contains the same "handlerName," by calling "notifyProc" and passing it the arguments "window" and "applicationData" to cause the button's action to be performed. In that event, "window" describes the particular application window whose contents should be affected by triggering the given button, and "applicationData" is a pointer to any other information that the application will require in order to carry out the intended button action. To that end, "notifyProc" is a procedure of type:

NotifyProc: TYPE=PROCEDURE [button: Button, action: String, window: Window, applicationData: POINTER] RETURNS [success: BOOLEAN];

The success return value of this "notifyProc" is used by the buttonclass to determine (when providing user-visible feedback that the button action is completed) whether to indicate to the user that the requested action has succeeded or failed.

b. Action Routines

The kernel's action routines are called by editors that manage button-containing documents, by application programs that use documents as control panels, and by button classes for helping the kernel to respond to calls made by such editors and application programs. In particular, the kernel provides three routines that are called by the editors of button-containing documents: HandlePress, DataStructureFromAttribute and AttributeFromDataStructure. Furthermore, the kernel provides two basic routines that are called by applications: GetValue, and SetValue. Finally, the kernel provides six basic routines that are called by button classes: PassEventToCommandHandler, GetField, SetField, GetAttribute, SetAttribute, and RegisterNameValuePair. These routines and their functions are defined in this section.

1. Action Routines Called by Editors

HandlePress: PROCEDURE [press: InputAction, button: Button, doc: ActiveDoc];

is one of the more fundamental routines in the embedded buttons architecture. An editor calls this routine when it discovers that the user has moved a cursor over a button and triggered the button (be that by clicking a mouse button, pressing a keyboard key or by some other means). The argument "press" is a representation of the method used by the user to trigger the button. Some buttons (e.g., pop-up buttons) behave differently depending on the physical key or keys that are depressed to trigger it, so that information is included in the "press" argument. The "button" argument describes which button was triggered, and the "doc" argument describes the document in which this button is located. When "HandleClick" is called, the kernel parses the button attribute to discover what button class should handle this click and passes the action to that button class for further processing.

Another routine that the editor may call is:

DataStructureFromAttribute: PROCEDURE [attribute: String, button: Button, doc: ActiveDoc] RETURNS [dataStructure: POINTER];

In order for the HandlePress routine to succeed, the kernel must parse the button attribute. It could do this parsing every time the button is triggered, but this would adversely affect performance. Instead, the editor can call the DataStructureFromAttribute routine once for each button at the time that the document is loaded. This routine parses the button attribute, builds a data structure to represent the button and returns this data structure to the editor. The editor can then store this data structure in place of the button attribute string as a run-time value of the button attribute. [Note: As an extra enhancement, the parsing can be done the first time the button is pressed, so that the cost need not be payed at the time the document is loaded for all of the buttons. With this scheme, the parsing cost is only payed for those buttons that are used.

When the document must be written to disk, a button attribute data structure can be turned back into a string using the AttributeFromDataStructure routine:

AttributeFromDataStructure: PROCEDURE [dataStructure: POINTER] RETURNS [attribute: String];

As will be seen, this routine takes a data structure of the form produced by the above-described DataStructureFromAttribute routine and turns it into a human-readable text string in the Poppy language. Editors call this routine when a document is being written to disk so they can represent the button attributes externally as text strings. Note that, for a particular button, the text string returned by this routine may not be identical to the text string that was passed to DataStructureFromAttribute as an argument. For instance, if the button is a multi-state button, its value may have changed from TRUE to FALSE and this new state will be reflected in the revised button attribute string.

2. Action Routines Called by Applications

GetValue: PROCEDURE [name: String, doc: ActiveDoc] RETURNS [value: String]

is a routine that returns the value of the variable named Value as it appears in the button or buttons in document "doc" that have the given text string "name" in the "Name:" field of their button attributes. If several buttons exist in this document with this name, then this routine returns the value of the first such button encountered. To improve performance, the GetValue routine checks to see if "name" has been registered by RegisterNameValuePair (see below) in a hash table. If so, it finds the associated value very quickly and returns it. Otherwise, with the help of the EnumerateButtons routine described in Section D.2. routine, it searches through all of the buttons in the document looking for the name and returns a value if the name is found. If no such named button is found, it returns the empty string.

SetValue: PROCEDURE[name: String, value: String, doc: ActiveDoc]; This procedure changes the value of the variable Value in all buttons in the document "doc" that have the given name. It also passes the button name, value, and doc to RegisterNameValuePair (see below) so that future calls to GetValue will produce the correct value quickly.3. Action Routines Called by Button Classes PassEventToCommandHandler: PROCEDURE [event: String, button: Button, application: String];

is called by a button class to inform the kernel that it is time to pass the text string called "event" to the command handler of the named button. The kernel determines from the button and the kernel's current tables of registered command handlers and linked documents (see the above-described LinkDocToWindow routine) which procedure to call to notify that command handler, then passes the event to that procedure, and finally returns.

GetField: PROCEDURE [fieldName: String, button: Button] RETURNS[field: String];

is a routine that returns the value of a particular field of the button attribute of a given button. For instance, if GetField ["CommandHandler" is applied to the multi-sate button for the above-described Colorizer application, it would return the string "Colorizer".

SetField: PROC[fieldName: String, field: String, button: Button];

is a procedure for assigning a new value to a particular field of a button attribute. Subsequent GetField operations on the changed field will return the new value.

GetAttribute: PROC[key: String, button: Button] RETURNS [pointer: POINTER];

While the button attribute (identitified by letting key be "ButtonAttribute") is the only attribute of a document element that is essential to the embedded buttons architecture, some button classes may wish to get the values of other attributes. For instance, the Buttonizer button described herein uses a second attribute (identitified by letting key be "ButtonAttributeLiteral"). The GetAttribute procedure makes all of these attributes available to the button classes. This routine returns a pointer to an arbitrary data structure, so the button class must know whether this data structure is a text string or some other data structure in order to make use of it.

SetAttribute: PROCEDURE[key: String, pointer: POINTER, button: Button, edited: BOOLEAN];

allows the button classes to change the value of any attribute of the document element described by the "button" argument.

RegisterNameValuePair: PROC [name: String, value: String, doc: ActiveDoc];

is a routine for storing the pair (name, value) in a hash table using "name" as the key. As will be recalled, the GetValue routine uses this table to quickly find the values of those named buttons that have stored their names and values in this table.

4. The Button Classes.

As described in section c.2 above, at least three different button classes are supported from the point of view of the user of a button-containing document, these classes provide three basic building blocks for interfaces made from documents. Furthermore, as described in section D.3.a, the set of button classes can be extended (even at run-time) by calling a registration procedure. Moreover, it will be recalled that each button class is defined by six procedures, also described in section D.3.a. In addition, a button of a of a given button class will have different fields in its button attribute to support its activity. This section contains examples of button attributes for all three of the above-described button classes, and describes how each class implements its six routines.

a. Pop-Up Buttons.

Pop-up buttons may display a pop-up menu when they are triggered (depending on the manner in which the user triggers them), and they perform an action based upon the menu item the user selects. For instance, the button attribute for a pop-up button that opens the file named in the text of the button itself as in FIG. 2C (this button attribute must be associated with a textual document element for this action to make sense) is as follows:

---

Poppy1
Class: PopUpButton
Menu: (
((<Concat "Open" <ButtonText>>) "Open" "Opens the file represented by this button")

-continued

)
CommandHandler: CommandTool
Feedback: (
(Mouse Moved <SetCursor bullseye>)
)

---

The PopUpButton class requires the field "Menu." The Class, CommandHandler, and Feedback fields are supported by the Embedded Buttons kernel, for all button classes.

The six basic routines for the pop-up button class are implemented as follows:

Instantiation. This routine reads the Menu field and creates a data structure representing the graphical appearance of the pop-up menu.

File Out. As this button attribute has no values, it does not change during use. The file out routine simply returns the original button attribute.

Button Press. First, the embedded buttons kernel 12 (FIG. 1) is requested to perform any feedback associated in the Feedback field with the button being pressed. Next, the pop-up menu is drawn on the user's display screen (if the user holds down the mouse button long enough to warrant the display), and the user is then allowed to make a menu selection. If the user made a selection, that selection is evaluated. For instance, in the above example, the expression <Concat "Open" <ButtonText>> would be evaluated, thereby finding the filename mentioned in the button's text and prepending the string "Open" to it. For instance, if the button was the text string "~/writings/diary," the concatenation would produce the string "Open ~/writings/diary." Finally, the kernel 12 passes this text string to the command handler (the "CommandTool" in this example). The command handler 14 then performs the action (e.g., displays the named file on the screen). Finally, the kernel 12 calls upon the editor to perform any feedback that is provided to show that the button command has completed.

Get Value. There is no value, so this procedure does nothing.

Set Value. There is no value, so this procedure does nothing.

Default Behavior. If there is no command handler, pop-up buttons simply display their command on the screen for the user to read. This is useful for debugging buttons of this class.

b. Multi-State Buttons.

FIG. 5B illustrates a multi-state textual button that can have the value TRUE or FALSE. When its value is TRUE, the text appears white on black. When FALSE, the text appears black on white. Its button attribute is:

---

Poppy1
Class: MultiStateButton
Name: GridOn
Variables: (Value: BOOL = TRUE)
UpClickMessage: (Toggle Grid)
CommandHandler: Picture Region
Feedback: (
  (Down (BeginButton ClearLooks LookItalic End Button))
  ((Value TRUE) (BeginButton ClearLooks LookWhiteOnBlack EndButton))
  ((Value FALSE) (BeginButton ClearLooks EndButton))
)

---

Multi-state buttons require that the "Variables" field appear in their button attributes and that a variable, called "Value," be defined. Additionally, it should be noted that the field called "UpClickMessage" in the above example describes the message to send to the command handler when the user finishes clicking on this button. The field "Name" is supported by the embedded buttons kernel; it gives the kernel a way to refer to the value of this button. The other fields, Class, CommandHandler, and Feedback are supported by the Embedded Buttons kernel for all button classes.

The Multi-State button class implements its six class specific routines as follows:

- Instantiation. This routine reads the Variables field and creates a data structure representing each named variable and its value. It also ensures that the button initially has the correct appearance by performing the feedback associated with the current value of Value. For instance, in this example, the button would send the string "BeginButton ClearLooks LookWhiteOnBlack EndButton" to the text editor, which makes the text of the button look normal (as a result of the ClearLooks command) except that it is white on black (as a result of the LookWhiteOnBlack). The BeginButton and EndButton commands in this example tell the text editor to apply the other commands to the text of this button, rather than to some other part of the document.
- File Out. To describe itself textually, a multi-state button must construct a new value for the Variables field by writing out the name and current value of each variable mentioned in the original button attribute. In this example, this involves writing out the string "TRUE" or "FALSE" depending on the current value of the variable, Value. The other fields of the button attribute do not change and are written outjust as they were read in.
- Button Press. First, the kernel is requested to perform any feedback associated in the Feedback field with the button being pressed. In the above example, the feedback line beginning with "Down" specifies that the button should be displayed in italics when the user clicks down on it. When the user releases the mouse button (or otherwise indicates that a selection has been made) the message "Toggle Grid" is sent to the command handler. If this expression contained procedure calls (such as <ButtonText> or <Concat> in the pop-up buttons example), such procedures would be called at this time.
- Get Value. This routine returns the value of the variable Value.
- Set Value. This assigns the new value to the variable Value and performs the feedback associated with the new value. For instance, in the foregoing example, if Value is set to FALSE, the edit instruction "BeginButton ClearLooks EndButton" would be sent to the text editor, thereby causing the button to become black on white text.
- Default Behavior. If there is no command handler, and the user completes a selection of this button, the UpClickMessage field is ignored. Instead, Value is cycled to its next possible value. For instance, in our example, each click would change this value from TRUE to FALSE or FALSE to TRUE.

c. Radio Buttons.

FIGS. 7A and 7B illustrate a pair of radio buttons that could be embedded in a graphical editor. As will be seen, the circle (FIG. 7B) is thicker than the square (FIG. 7A) to indicate that the circular button is "on" while the square button is "off". The button attributes for these two buttons are nearly identical. More particularly, the attribute for the square button is:

```
Poppy1
Class: RadioButton
CommandHandler: DrawShapes
Name: Shape
RadioButtonValue: Rectangle
Variables: (State: BOOL = FALSE)
UpClickMessage: (RectangleMode)
Feedback: (
  ((State TRUE) ((BeginButton) (LineWidth 5.0) (DashesOff)
    (EndButton)))
  ((State FALSE) ((BeginButton) (LineWidth 2.0) (DashesOff)
    (EndButton)))
  (Down ((BeginButton) (Dashed) (EndButton)))
  (UP ((BeginButton) (DashesOff) (EndButton))
```

In the button attribute for the circular button, the boldface word "Rectangle" in the above example would be replaced by "Circle," and the boldface word "FALSE" would be replaced by "TRUE".

As will be seen, the RadioButton class supports the fields RadioButton Value, Variables, and UpclickMessage. The RadioButton Value field describes one possible value of the variable Value, which is not mentioned explicitly in the button attribute but which is defined implicitly by all of the radio buttons that have the same name. For instance, in the foregoing example, Value can take on the values of the set {Rectangle, Circle}. Variables and UpClickMessage, on the other hand, have functions similar to their functions for multi-state buttons. However, for radio buttons, the variable State must be defined and must be a BOOLEAN (TRUE/FALSE) value. Moreover, the State value may be TRUE for only one button in a set of radio buttons. All radio buttons in a group have the same Name field. The other fields, Class, CommandHandler, Name, and Feedback are supported by the Embedded Buttons kernel for all button classes.

Radio buttons implement their six class procedures as follows:

- Instantiation. This routine reads the Variables field and creates a data structure representing each named variable and its value. It also ensures that the button initially has the correct appearance by performing the feedback associated with the current value of State. For instance, in the above example, the square button would send the editor interpretable string "(BeginButton) (Line Width 2.0) (DashesOff) (EndButton)" to the graphics editor, which makes the square look thin and undashed. Likewise, the circular button would send the interpretable string "(BeginButton) (LineWidth 5.0) (DashesOff) (EndButton)" to the editor, thereby causing the editor to make the displayed circle thick and undashed.
- File Out. Just like a multi-state button, a radio button must produce a new string to represent its Variables field. The other fields do not change and are written out as the same string that was read in.
- Button Press. As before, the kernel first is requested to perform any feedback associated in the Feedback field with the button being pressed. In the above example, the feedback line beginning with "Down" specifies the selected button should be rendered a dashed shape when the user clicks down on it. When the user releases the mouse button (or otherwise indicates that a selection has been made) the message "RectangleMode" is sent to the command handler. If this expression had contained procedure calls (such as <ButtonText> or <Concat> in the pop-up buttons example), these would have been called at this time.

Get Value. The Get Value routine for radio buttons is interesting. The value of a related group of radio buttons is the value of the RadioButtonValue field of the one button of the group whose State variable is TRUE. Thus, in the above example, Get Value would return "Circle".

Set Value. Set Value is also interesting. The Value specified must be the value of the RadioButtonValue field of one of the buttons in the group. This button's State variable is set to TRUE and the State variables of all of the other buttons in the group are set to FALSE. Each variable executes the appropriate feedback for its new state (buttons that did not change state need not execute any feedback actions).

Default Behavior. If there is no command handler, and the user completes a selection of a radio button, its UpClickMessage is ignored. Instead, the State value of the selected button is set to TRUE, and all other buttons in its group have their State variables set to FALSE. Feedback is performed as described for the Set Value routine.

5. The Command Handler

When a button is triggered, a command is sent to a command handler application 14 (FIG. 1) to perform a predetermined function. Each button describes which command handler 14 will receive each command by naming that handler as part of the command or in the "CommandHandler" field of the button attribute. In fact it is possible to send commands to several command handlers by listing their names in the CommandHandler field.

New command handlers can be added to the software system on-the-fly.1). Any program can call the RegisterCommandHandler procedure to register a command handler name and call-back procedure with the EmbeddedButtons kernel 12 (FIG. 1) Subsequently, the kernel 12 will handle all commands directed to a registered command handler name by calling its registered call-back procedure. The call-back procedure, in turn, takes two arguments: a command, and a description of the button being pressed. Moreover, it returns an indication of whether or not the command succeeded, thereby permitting different feedback to be provided to the user in the case that a command fails.

Advantageously, the system includes at least the following basic set of command handlers 14 (these handlers provide support for a wide range of button behaviors):

a. The CommandTool Command Handler.

The CommandTool command handler interprets its command argument as though it had been typed by a user to, say, a Cedar command shell. The Cedar command shell works much like the command shell in UNIX inasmuch as any output from the command shell is written to a special typescript that is shared by all of the embedded buttons.

b. The Buttonizer Command Handler.

The Buttonizer command handler applies a button attribute to a user-selected document element. More particularly, the button attribute that is applied is taken from a special, otherwise-unused attribute called the "ButtonAttributeLiteral" of a so-called Buttonizer button. As will be appreciated, this approach makes it just as easy to alter the button attribute of the buttons that are created through the use of such a Buttonizer button as to edit the behavior of the Buttonizer button itself because both behaviors can be altered by editing an attribute of the Buttonizer button. For instance, here are the attributes of a Buttonizer button for producing pop-up buttons:

```
ButtonAttribute: Poppy1
  Class: PopUpButton
  Menu: (
    ((Selected) "Buttonize" "Applies the ButtonAttributeLiteral
    property of this button to the selected text")
  )
  CommandHandler: Buttonizer
ButtonAttributeLiteral: Poppy1
  Class: PopUpButton
  Menu: (
    ((Event1) "First Item" "Sends Event1 to application")
    ((Event2) "Second Item" "Sends Event2 to application")
  )
```

The ButtonAttribute attribute describes the behavior of this button itself. The ButtonAttributeLiteral attribute, on the other hand, becomes the ButtonAttribute of the newly created button. Therefore, in this particular case, the new button will have a pop-up menu with two elements. Furthermore, this pop-up button will send its commands to a command handler called "Message Window."

c. The Message Window Command Handler.

The message window command handler simply prints out the command in a special region of the display screen that is reserved for feedback so that the user can read it. This command handler is especially useful for debugging new buttons.

d. The Document Editor Command Handler.

The document editor command handler sends the button's command string to a suitable document editor, such as the aforementioned Tioga editor. The commands in this text string are generally used to edit the document in which the button appears or the document that contains the current user-selected document elements, but they could be employed to edit any document. As will be appreciated, this command handler allows buttons to be used to trigger document editor macros. For instance, a pop-up button with the button attribute:

```
ButtonAttribute: Poppy1
  Class: PopUpButton
  Menu: (
    ((ApplyLook Bold) "Bold" "Make selected text bold")
    ((ApplyLook Italics) "Italics" "Make selected text italic"))
  CommandHandler: Document Editor
``` causes the document editor editor to make selected text objects bold when the first menu item is selected, or italic when the second menu item is selected.

6. The Editor Input Language.

The first example in section D.1 shows the button attribute for a button that changes its text's appearance to bold while it is active and back to plain face when it is idle. This font change is accomplished by sending the command strings "BeginButton ApplyLook Bold EndButton" and "BeginButton RemoveLook Bold EndButton" to the document editor. Similarly, the button described in section D.5 performs an editor macro on whatever text string the user has selected.

While it is not strictly necessary for a document editor to be able to interpret an input editing language, embedded buttons become much more useful when this capability exists. Given such an editor, the user can include document editing strings as sub-strings of a button attribute for invoking standard document editor operations to display feedback and to perform macro operations in a particular document editor.

7. Handling Button Presses.

Figure 8:
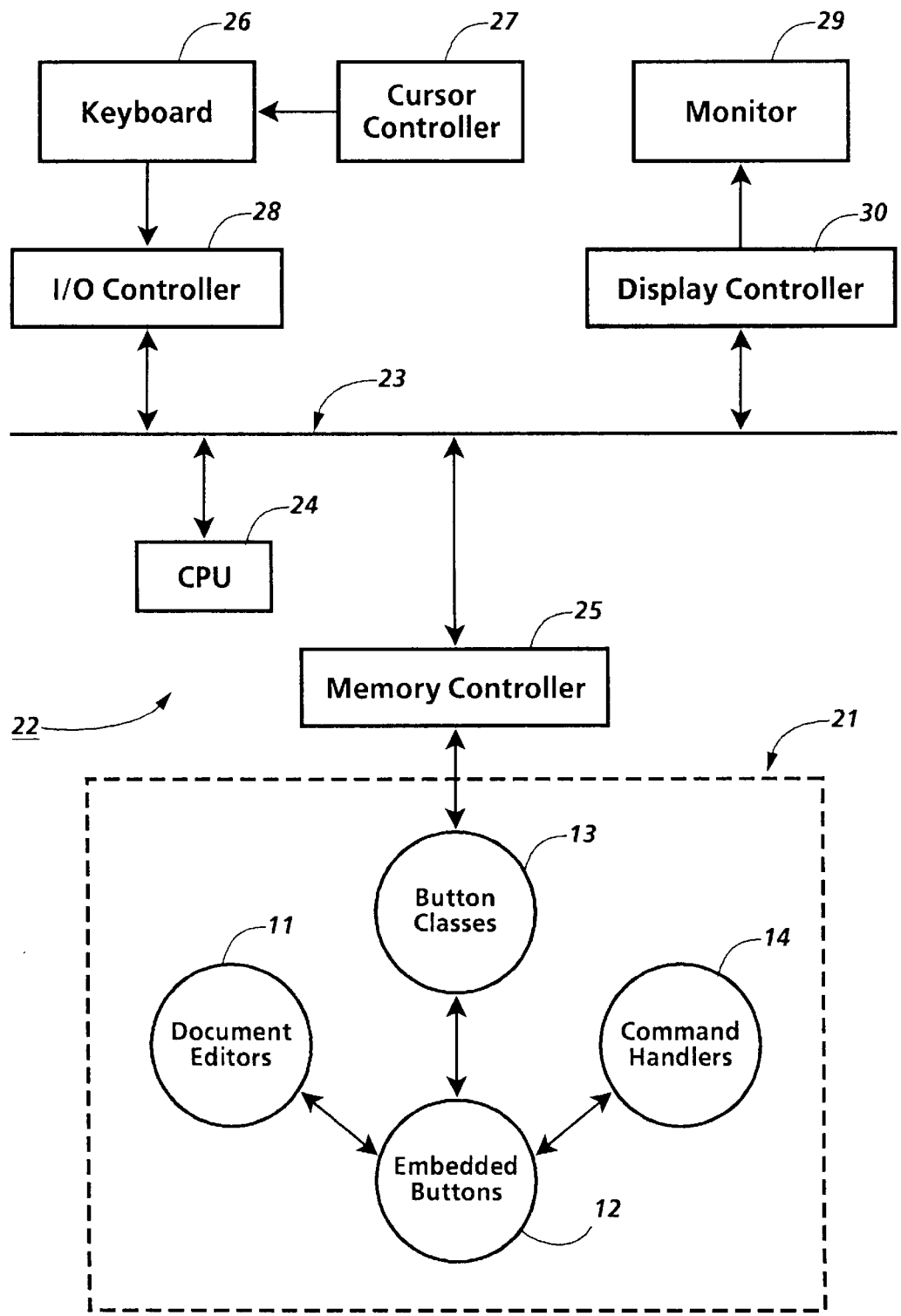
FIG. 8 illustrates the communication paths that are provided by the software architecture of the present invention and the architecture of an exemplary computer system.

FIG. 8 illustrates the communication paths that are used when the user triggers an embedded button. These communication paths are used in several steps as follows:

Step 1: Notification (Editor 11 to EmbeddedButtons) Kernel 12 to specified Button Class 13).

When the user clicks, say, a mouse button on an embedded button, the editor 11 that manages the document containing the embedded button passes the mouse action, a description of the embedded button's position in the document, and its button attribute to the Embedded Buttons kernel 12. The kernel 12, in turn, reads the "Class" field of the button attribute to route the above information to the button handler for the specified Button Class 13.

Step 2: Initial Feedback (Specified Button Class 13 to Embedded Buttons kernel 12 to Editor 11).

If appropriate, the button class 13 asks the Embedded Buttons kernel 12 to perform any feedback actions associated with this mouse action. For instance, a button might draw a box around itself when the mouse enters it, or might gray itself when the mouse clicks on it. The kernel 12 looks up the mouse action in the "Feedback" field of the button, and passes any commands that it finds to the editor 11 that manages the button.

Step 3: Choosing an Action (Specific Button Class 13) to Embedded Buttons kernel 12 to (Command Handler 14).

At this point, the button class may pop up a menu of actions or simply wait for the mouse button to come up. Once the user has chosen an action for this button to perform, the button class 13 may request more feedback to show that an operation is in progress (see Step 2). Then, the button class 13 sends the chosen action list to the kernel 12. The kernel looks up the name in the "CommandHandler" field of the button attribute, and passes the action list to the command handler routine 14 that is registered under that name.

Step 4: Final Feedback (Specified Button Class 13 to Embedded Buttons kernel 12 to Editor 11).

Once the command handler 14 has finished performing the action that was triggered by the button, the button class 13 asks the editor 11 (via the kernel 12) to perform some final feedback (e.g., returning the embedded button to its original appearance.

As shown in FIG. 8, the software system resides in virtual memory 21 of a more or less conventional computer system 22. For example, the computer system 22 suitably includes a bus 23 for linking a central processing unit (CPU) 24 to the virtual memory 21 via a memory controller 25, to a keyboard 26 and a cursor controller (e.g., mouse) 27 via an I/O controller 28, and to a monitor 29 via a display controller 30. However, it is to be understood that the present invention may be applied to computers having other architectures because the invention is not dependent on the architecture of the host computer 22.

8. Getting and Setting Button Values.

Multi-state buttons and radio buttons both contain values that can be queried by an application program. Handling these types of buttons requires two complications to the mechanism described in section D.3.b.

First, it should be possible for an application program to find out the current value of one of these buttons. In that connection it will be recalled that the embedded buttons kernel 12 provides a routine, GetValue, that takes an active document and a button name as arguments and returns the value of the button as a text string. Fortunately, whenever an application is using an active document as its control panel, the application has a pointer to this active document, so making this procedure call is straightforward. As will be appreciated, the kernel 12 may dynamically register such an active document as a named command handler 14 for the application in response to a routine registration request made by the application.

Second, the state changes of the button may need to be synchronized with other application actions. Consider a drawing program that uses an active document to set the value of the current color. The user should be able to set the color to red, draw a shape, set the color to blue, and draw a second shape, even if the application has gotten behind and has not finished displaying the first shape at the time when the user changes the current color to blue. To prevent confusion, the button (or buttons) that change the current color should not change the value that they report, until the application is done using the current value.

To make this synchronization possible, multi-state buttons and radio buttons do not automatically change state. Instead, they send to the application a request to change state. When the application is ready, it calls the routine, SetValue, to set the button to the new value. This leads to a fifth step in input handling:

Step 5: Changed Value Feedback (Application to Embedded Buttons kernel to Editor).

When an application calls SetValue, the embedded buttons kernel 12 looks in the "Feedback" field of each button whose value has changed for a feedback action to perform. If one is listed, this action is sent to the editor 11 that manages the button. Preferably, in order to respond quickly when applications ask for the value of a named button, the embedded buttons kernel 12 maintains a hash table (a standard computer science data structure. See Don Knuth. The Art of Computer Programming, Volume 3) of values, where the hash table key is derived from the variable name of the button, and the value stored in the table is current value of the button. One such hash table is maintained for each currently active button-containing document, and that table is updated each time a named button variable within the document to which the table pertains changes its value.

8. Linking Documents to Application Windows.

In many systems, a given application may be running in several windows at once. However, operations in the control panel of a given window are intended to apply to the contents of that window, and not to the contents of any other window. In addition, some windows have multiple panes. Furthermore, different buttons in a given control panel may be intended to apply to different panes.

Thus, to generalize the use of button-containing documents as control panels, the embedded buttons kernel 12 provides the aforementioned LinkDocToApplication routine that can be called by an application for linking a CommandHandler name in a given active document to a particular pane of an application window. For instance, a mail reading program may use one pane for displaying message headers, and another pane for displaying message bodies. A button that applies to the headers then stores "CommandHandler: Headers" in its button attribute, while a button that pertains to the message body stores "CommandHandler: Bodies" in its button attribute. In this case the link routine would be called twice, once to link the "Headers" buttons and once to link the "Bodies" buttons.

Note that the buttons themselves are not linked to the application panes. Rather, the CommandHandler name to which they refer is linked. This makes it possible to add new buttons to the control panel at run time that will be automatically linked to the document containing the correct panel when they mention the correct CommandHandler.

Conclusions

In view of the foregoing, it will be understood that systems that allow buttons to be embedded in documents provide the following capabilities:

(1) By using the buttons that are embedded in documents, readers can act on the information in the document using facilities in the document itself; this integration allows users to stay focused on their tasks, and saves screen space that would otherwise be used for tools "off to the side" of the document.

(2) Wherever systems exist for sending structured documents through the mail, buttons can be sent through the mail as well, allowing users to easily exchange useful buttons and to respond quickly to the information received in the electronic mail.

(3) Users can copy pieces of existing control panels into new documents to create customized control panels.

In addition, the button architecture described herein provides these additional advantages:

(4) Buttons can be edited through the use of standard editing document operations, because they are ordinary document elements.

(5) The actions performed by the buttons can refer to the contents or appearance of the button itself, and hence to any properties that the document editor supports. Thus, buttons can be used to modify their own appearance or to transfer their properties to other objects in the same document editor.

(6) Buttons can have any shape. In many systems, the buttons must be rectangular. But, in the system described herein, the buttons are arbitrary document elements and their shapes are limited only by the capabilities of the editors in which they are embedded.

(7) Because such a button is represented simply as an additional string attribute on a document element, button-containing documents can be generated through the use of existing software for generating structured documents.

A more detailed review of the aforementioned advantages of this invention follows.

1. Staying Focused on the Task.

Often an electronic document is read to find information that the user intends to put to use immediately. For example, when a user enters a command to list the files in a directory, the user often desires to read, rename, or delete some of the files in the list. In most current interfaces, the user's attention must be diverted from the list to a command shell or file tool to open an editor window on one of the listed files. If, however, the file names are buttons, as they are in some Symbolics applications, these operations can be performed directly on the file list, without diverting attention from the list.

As another example, software modules may include a set of buttons near the text of each routine for testing the routine, timing its performance, or providing hypertext links to places where that routine is further documented, implemented, or called.

2. Buttons in the Electronic Mail.

The sender of an electronic mail message may wish to include buttons that help recipients act on the information in the message. For instance, when sending a message describing a software release, a phone number, or a file, the sender might include a button to install the new software, dial the phone number, or open the file, respectively.

3. Reusing Control Panels.

As previously described, sets of buttons can be linked to a particular pane of an application window, allowing button-containing documents to act as control panels. If control panels are documents, document editors can be used to navigate through them, to modify them, to copy them, and to combine parts of them into customized control panels for special tasks.

For example, FIG. 9A shows a dialog box that searches for text patterns. It is set to search for the bold word Apple, and replace it with italic word Banana. In FIG. 9B, this control panel has been copied into a document. To save space, a hider button called "Parameters" has been used to encapsulate the control panel shown in FIG. 9A. (A hider button hides inside of it a small document; when the hider button is pressed, it reveals the small document.) The Search, Yes, No, and Substitute buttons shown in FIG. 9B provide functions for performing replacements either one-by-one or all at once. Together these buttons form a compact control panel for a specific search task (searching for Apple and replacing it with Banana). To change the parameters, the user can expose and use the hidden control panel (FIG. 9A).

4. Document Skills Become User Interface Skills.

Conventional document editors can create, select, move, copy, delete, store, retrieve, search for, scroll through, change the style of, selectively display, and print document information. When documents are user interfaces, all of these capabilities become available both for creating and employing user interfaces.

Moreover, the familiar layout capabilities of document editors can be used to compose control panels. Graphical editors can be used to create borders and icons, and text editors can be used to lay outlines or tables of buttons with appropriate colors, fonts, underlining and so forth. Such control panels inherit the ability of text editors to reformat text for different page sizes and scaling factors.

For interface users, document editors provide ways to navigate through the user interface. Users may build large documents, organized into sections and sub-sections, containing many buttons, computed fields, and other active elements to aid them in a variety of tasks. These users can then take advantage of scrolling, level-clipping (e.g., displaying header names only), and textual or graphical search to find user interface components.

Textual search-and-replace and graphical search-and-replace (See D. Kurlander et al., "Graphical Search and Replace," *Computer Graphics,* Vol. 22, No. 4, August 1988, pp. 113–120) can be used to quickly make user interfaces from existing documents. For instance, a document of names, addresses, and phone numbers can be turned into an active document by searching for strings that look like phone numbers and turning them into buttons that dial the phone number.

5. Customizing Document Editors.

Just as the capabilities of document editors can be used to improve user interfaces, button-containing documents can be used to enhance document editors. This reinforcing cycle can result in rapid improvements in both document editors and user interfaces. For example, users can create button collections that perform tedious or complicated text editor operations, including text searches and style changes. One particularly useful embodiment of such a button, which is called a "stuffer," inserts its own textual contents at the current text editor cursor position.

Buttons can also be used to improve document navigation. One example, inspired by the GUIDE hypertext system (P. Brown, "A Simple Mechanism for Authorship of Dynamic Documents," J. C. van Vliet (ed), *Text Processing and Document Manipulation,* Proceedings of the Internal Conference, Cambridge University Press, April 1986, pp. 35–42) is the ability to hide a portion of a document behind a button. With each button press, the text is alternately revealed and hidden. Such hider buttons allow the user to browse through a document using screen space only for document parts of interest. Note that a document with hider buttons can be used as a layered control panel. See FIGS. 9A and 9B.

Buttons can be used in unusual ways to customize a graphics editor. FIGS. 10A and 10B show a collection of circles drawn with an illustration program. It will be assumed that the user would like to try different colorings of these circles. That could be carried out by employing normal editor commands to select each circle in turn and apply a color to it, but that would take several mouse clicks for each color change. It is significantly easier to turn each circle into a two-state button that is, say, black when on and white when off. In that event, the color changes can be made with one mouse click per color change. When all such changes have been made, the button activity can be turned off (or the button properties can be removed from the shapes) leaving a recolored picture that can one again be edited normally.

6. Buttons Can Have Any Shape.

Any cursor-based editor, be it for text, graphics, equations, tables, etc., has a way to detect which object the user is pointing at. The button attribute architecture takes advantage of these facilities to tell when the user is pressing a button. Thus a button can be a circle, a triangle, a gingerbread man, a fancy lace pattern, or any shape so long as the document editor in which the button is embedded can detect when the user is pointing at that shape. Recall FIG. 4A, which shows that a button can even be a single line segment in a system where the user need only point near an object rather than exactly at it.

7. Generators.

One of the more important properties of the embedded buttons that are contemplated by this invention is that they can be created and modified by users through the use of familiar document editor operations for most of the steps of the process. However, it is also useful to be able to generate embedded buttons automatically under program control. For instance, a command that lists all of the files in a directory might add the button attribute to the file names, turning the file names into buttons that open the corresponding file when pressed.

Using the architecture of this invention, the capability to generate button-containing documents by program requires no special programming. The system need only provide a way for programs to generate structured documents with arbitrary attributes on their document elements. This capability is already present in systems like Digital Equipment Corporation's CDA architecture which allow data, called "private data," that is restricted to a particular document-processing implementation to be associated with standard document elements. See the *CDA (Compound Document Architecture)* Manual, Digital Equipment Corporation, Maynard, Mass., November 1988, Section 3.1.5.6. Given such a structured-document generator, all that is needed to generate buttons is to attach an attribute called "ButtonAttribute" when creating those parts of the document that are to behave as buttons.

What is claimed:

1. A programmed computer system having a user interface that optionally includes custom buttons for initiating predetermined actions when triggered by a user; said buttons being embodied in electronic documents as hidden persistent character string defined button attributes associated with human interpretable elements of such documents; the button attribute of each of said buttons specifying a button class, button data, a command handler, and any desired user feedback; said system comprising at least one document editor for loading user selected ones of said documents into said system, such that said editor constructs a data structure for each of said user selected documents, whereby the button attributes for any buttons embodied in any of said selected documents are instantiated in the editor constructed data structure for said document as components of their associated document elements; said editor having a user settable input redirection switch for selectively operating said editor in a buttons-on mode and a buttons-off mode;

at least one class-specific button handler for a specifiable button class, each button handler containing a list of commands for a predetermined button class;

a plurality of specifiable command handlers for executing the commands provided by said button handler; and a centralized kernel for parsing the button attributes of each button that is triggered by said user and in so parsing to identify the specified button class of said button and the specified command handler for said button; said kernel providing communication paths between said editor, the button handler for the specified button class of said button, and the specified command handler for said button to carry out the action and feedback that are called for by said button.

2. The system of claim 1 wherein said kernel registers said button handlers, and said command handlers by name.

3. The system of claim 2 wherein said kernel dynamically extends support for additional editors at run-time.

4. The system of claim 2 wherein said kernel includes registration procedure support for dynamically registering button handlers for additional button classes at run-time.

5. The system of claim 2 wherein said kernel includes registration procedure support for dynamically registering additional command handlers at run-time.

6. The system of claim 2 wherein said kernel includes support for linking documents containing such buttons to selected application windows.

* * * * *